United States Patent
Burke (10) Patent No.: US 6,952,407 B2
(45) Date of Patent: Oct. 4, 2005

(54) MINIMIZING LATENCY WITH CONTENT-BASED ADAPTIVE BUFFERING

(75) Inventor: Christopher J. Burke, Boxford, MA (US)

(73) Assignee: Snowshore Networks, Inc., Chelmsford, MA (US)

( * ) Notice: Subject to any disclaimer, the term of this patent is extended or adjusted under 35 U.S.C. 154(b) by 805 days.

(21) Appl. No.: 09/906,969

(22) Filed: Jul. 17, 2001

(65) Prior Publication Data

US 2002/0141338 A1 Oct. 3, 2002

Related U.S. Application Data (60) Provisional application No. 60/270,571, filed on Feb. 22, 2001.

(51) Int. Cl.[7] .................................................. H04J 1/16
(52) U.S. Cl. ...................................... 370/252; 370/394
(58) Field of Search ................................. 370/389, 390, 370/392, 394, 474, 475, 253, 229, 230, 230.1, 231, 233, 234, 235, 235.1, 236, 236.1, 238, 247, 252, 395.4

(56) References Cited

U.S. PATENT DOCUMENTS

| | | | | |
|---|---|---|---|---|
| 4,726,019 A | * | 2/1988 | Adelmann et al. | 370/474 |
| 4,748,620 A | * | 5/1988 | Adelmann et al. | 370/394 |
| 6,072,776 A | * | 6/2000 | Takamichi | 370/241.1 |
| 6,108,303 A | * | 8/2000 | Fahmi et al. | 370/230 |
| 6,233,256 B1 | | 5/2001 | Dieterich et al. | 370/506 |
| 6,363,065 B1 | | 3/2002 | Thornton et al. | 370/352 |
| 6,370,161 B1 | | 4/2002 | Ehrlich et al. | 370/516 |
| 6,370,163 B1 | | 4/2002 | Shaffer et al. | 370/519 |
| 6,674,716 B1 | * | 1/2004 | Luijten | 370/230 |
| 6,690,645 B1 | * | 2/2004 | Aweya et al. | 370/230 |
| 6,754,182 B1 | * | 6/2004 | Aznar et al. | 370/252 |

\* cited by examiner

*Primary Examiner*—Dang Tong
*Assistant Examiner*—Phuc Tran
(74) *Attorney, Agent, or Firm*—Weingarten, Schurgin, Gagnebin & Lebovici LLP (57) ABSTRACT

A system and method for minimizing adverse affects of network transfer latency on packet data transmission that reduces degradation of a perceived quality of the data transmission. The system includes at least one interface device linking a first computer network to a second computer network. The interface device receives at least one group of packets transmitted across the first network in a buffer, performs packet-based media processing on the packets based on a type of information content of the packets, and transmits the processed packets to the second network. While receiving the group of packets, the interface device determines whether any packets are "late". The interface device waits longer for late packets likely to contain active speech (or active music) than late packets likely to contain silence. Further, the interface device waits a fixed time for late packets containing fax data. In the event a maximum waiting time is exceeded, the interface device declares the corresponding late packet "missing" and drops the missing packet.

33 Claims, 3 Drawing Sheets

MINIMIZING LATENCY WITH CONTENT-BASED ADAPTIVE BUFFERING

CROSS REFERENCE TO RELATED APPLICATIONS

This application claims priority of U.S. Provisional Patent Application No. 60/270,571 filed Feb. 22, 2001 entitled MINIMIZING LATENCY WITH CONTENT-BASED ADAPTIVE BUFFERING.

STATEMENT REGARDING FEDERALLY SPONSORED RESEARCH OR DEVELOPMENT

N/A

BACKGROUND OF THE INVENTION

The present invention relates generally to systems and methods for minimizing adverse affects of network transfer latency on packet data transmission, and more specifically to a system and method for minimizing the adverse affects of network transfer latency that reduces a perceived quality degradation of the packet data transmission.

Computerized network interface devices are frequently employed to link different types of computer networks to one another. For example, such network interface devices may be configured to operate as a "gateway" device to translate data traffic from one protocol to another, as an "endpoint" device to store and forward fax data during a fax "store-and-forward" session, or as any other suitable device capable of linking two (2) computer networks together.

One conventional computer network arrangement includes a network interface device configured to link a packet switched network such as the Internet to a synchronous circuit switched network such as the Public Switched Telephone Network (PSTN). The interface device typically performs packet-based media processing on packets of sampled and possibly compressed data transmitted across the packet switched network. For example, the packet data may comprise audio data including samples of voice or music, fax data, modem data, and/or telephony signaling tones. Further, the interface device may perform operations for packet data de-jittering, line echo canceling, packet data decoding, and/or sample clock regenerating, among other possible packet-based media processing operations.

A shortcoming of transmitting packet data across packet switched networks is that it is often difficult to assure reliable delivery of the packet data. For example, when transmitting packet data from a source node in a packet switched network to a network interface device such as a gateway or endpoint device via at least one intermediate node in the packet switched network, the intermediate node may at least temporarily stop accepting data due to traffic congestion, network maintenance, or node failure, and cause the packet data to take an alternate route to the interface device. As a result, respective packets may take different routes from the source node to the interface device, thereby making the packet data subject to varying network transfer latencies. This can make it hard to assure that the packet data will be received by the interface device at a specified rate and in the proper sequence, and that no packet data will be inadvertently dropped during transmission.

Varying network transfer latencies can also influence a user's perception of the quality of the packet data transmission in different ways, depending on the type of information content of the packet data. For example, in the event the packet data contains voice samples, network transfer latencies that cause the voice samples to be delayed by more than about 200 msecs may significantly degrade the natural dynamics of a telephone conversation. Moreover, in the event the packet data contains fax data, network transfer latencies that cause the fax data samples to be received in an incorrect sequence or cause at least one of the data samples to be dropped may lead to undesirable bit errors in a facsimile output.

In an attempt to minimize the adverse affects of network transfer latency, the network interface device included in the conventional computer network arrangement typically buffers the packet data. For example, the interface device may temporarily store the packet data received from the packet switched network in a buffer until a predetermined amount of the packet data samples are received and stored, sequentially sort and decode the packet data samples, and transmit the sorted and decoded packet data samples to the user's location in the synchronous circuit switched network. However, such packet data buffering typically introduces additional delay that can further degrade the user's perception of the data transmission, especially when the type of information content of the packet data is voice or music.

It would therefore be desirable to have a system and method for minimizing adverse affects of network transfer latency on packet data transmitted across packet switched networks. Such a system and method would minimize the adverse affects of network transfer latency with reduced degradation of a user's perception of the quality of the data transmission.

BRIEF SUMMARY OF THE INVENTION

In accordance with the present invention, a system and method for minimizing adverse affects of network transfer latency on packet data transmission is provided that reduces degradation of a perceived quality of the data transmission. Benefits of the presently disclosed invention are achieved by configuring at least one network interface device such as a "gateway" or "endpoint" device included in the system to adapt itself to the type of information content of the packet data when performing packet-based media processing.

In one embodiment, the system includes at least one network interface device such as a gateway or endpoint device linking a first computer network comprising a packet switched network to a second computer network, which may or may not comprise a packet switched network. Further, the interface device is configured to receive at least one group of packets or frames transmitted across the packet switched network in an adaptive buffer, perform packet-based media processing based on the type of information content of the packets in the buffer, and transmit the processed packets to the second computer network.

While receiving the group of packets in the adaptive buffer, the interface device monitors respective sequence numbers of the packets, and sequentially sorts the packets based on the respective sequence numbers to prepare the packets for further processing as a stream. Specifically, the interface device determines whether any packets in the group are "late". Late packets are indicated by corresponding gaps in the packet number sequence.

In the event the type of information content of the late packets is voice or music, the interface device maintains a state table for the stream of packets. In a preferred embodiment, the state table includes a weighted energy value that may be determined as described below for at least one previous frame, an average packet delay time, a pointer to the sorted group of packets stored in the adaptive buffer, the frame size, the coding type, a list of late packet sequence numbers including assigned waiting times, and the last processed packet sequence number.

Moreover, the interface device determines whether the late packets are likely to contain either active speech (or active music) or silence by calculating a weighted energy value for at least one frame immediately preceding the late packets. In a preferred embodiment, the interface device calculates the weighted energy value by integrating voice or music samples across the at least one frame. Next, the interface device multiplies the calculated weighted energy value by a predetermined scaling factor based at least on the frame size and the coding type, as indicated in the state table for the packet stream.

The interface device also maintains a "waiting time" table with entries comprising respective periods of time the interface device is to wait before declaring respective late packets "missing". In a preferred embodiment, the waiting time values stored in the waiting time table range between 0 and 200 msecs. The interface device waits longer for late packets likely to contain active speech (or active music) than late packets likely to contain silence. Further, the interface device employs the scaled energy value as an index to the time values in the waiting time table, retrieves the indexed waiting time value, and assigns the retrieved waiting time value to the corresponding late packet sequence number, as indicated in the above-mentioned state table.

After assigning the waiting time values, the interface device monitors actual late packet waiting times to determine whether any time value in the waiting time table has been exceeded. In the event a time value in the waiting table has been exceeded, the corresponding late packet is declared missing and the interface device stops waiting for that packet's arrival, i.e., the missing packet is dropped. The interface device may calculate the percentage of packets that are determined to be late and the percentage of packets that are subsequently dropped and use those calculated percentages for optionally adjusting the time values stored in the waiting time table. The interface device then resumes processing the remaining packets of voice or music samples.

In the event the information content of the packets is fax data, the interface device determines whether a packet comprising at least one fax data sample and arriving during an established fax session is late. Next, the interface device monitors actual late packet waiting times to determine whether a predetermined waiting time value has been exceeded. In a preferred embodiment, the predetermined waiting time value for the fax session is about 200 msecs.

Moreover, in the event the predetermined waiting time value has been exceeded, the corresponding late packet is declared missing and the interface device stops waiting for that packet's arrival, i.e., the missing packet is dropped. The interface device then resumes processing the remaining packets of fax data samples.

By adapting itself to the type of information content of the packet data, e.g., voice, music, or fax, the interface device either waits for late packets or drops missing packets in a way that both minimizes the adverse affects of network transfer latency and reduces the perceived quality degradation of the data transmission.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

A computer network arrangement is disclosed that minimizes adverse affects of network transfer latency on packet data transmission while reducing a perceived quality degradation of the data transmission. The presently disclosed computer network achieves these and other benefits by adapting itself to the type of information content of the packet data.

Figure 1:
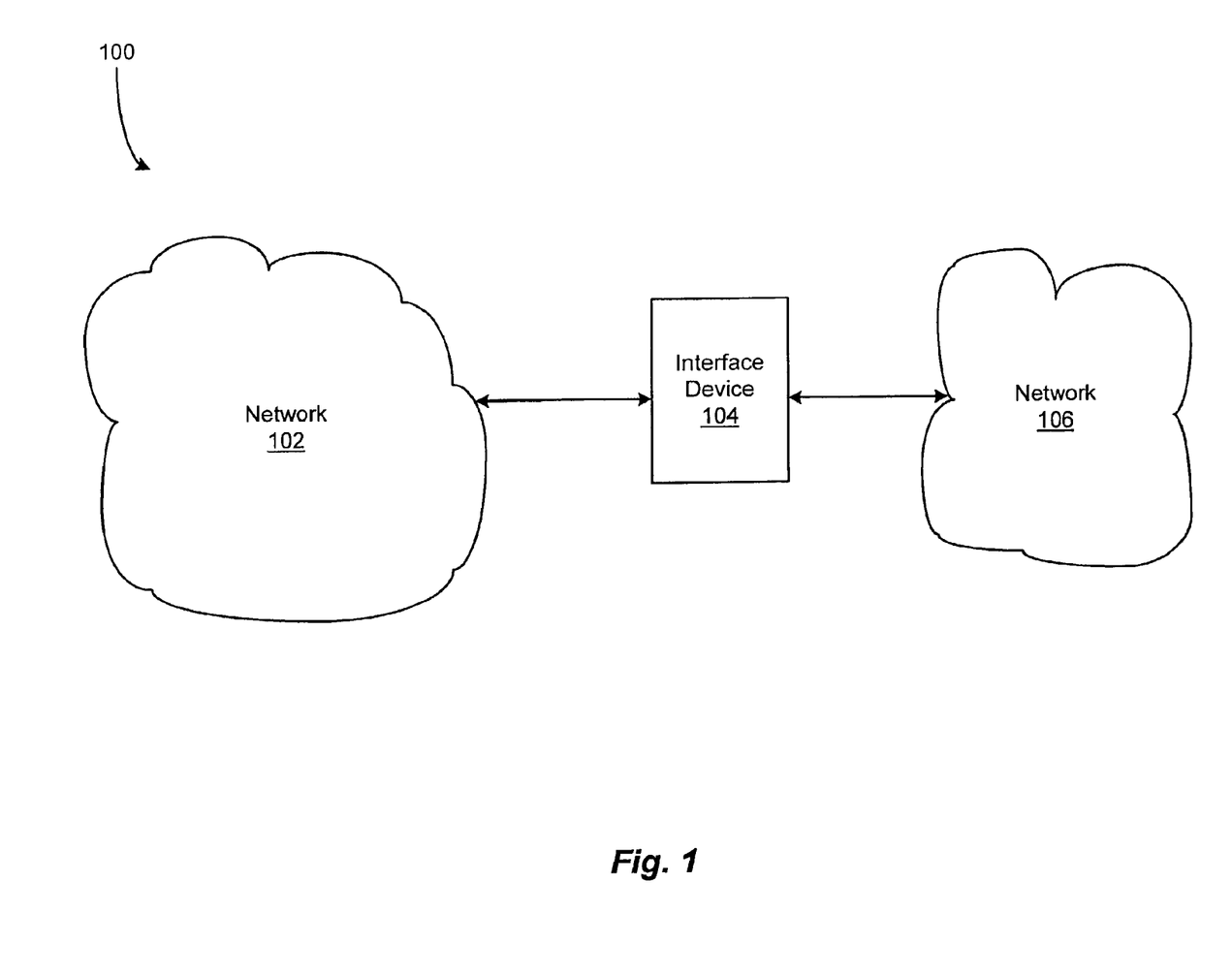
FIG. 1 is a block diagram of a computer network arrangement according to the present invention.

FIG. 1 depicts a block diagram of a computer network arrangement 100 according to the present invention. In the illustrated embodiment, the computer network arrangement 100 includes a network interface device 104 such as a "gateway" or "endpoint" device configured to link a network 102 to a network 106, which may comprise two (2) different types of computer networks.

For example, the interface device 104 may include at least one memory such as Read-Only Memory (ROM) and/or Random Access Memory (RAM) for storing operating systems, application software modules, and packet data; and, at least one processor for controlling connections to the networks 102 and 106 and executing packet-based media processing applications. Further, the network 102 may comprise a packet switched network such as the Internet, and the network 106 may comprise a synchronous circuit switched network such as the Public Switched Telephone Network (PSTN). It is understood, however, that in alternative embodiments, the networks 102 and 106 may comprise respective packet switched networks.

Specifically, the interface device 104 is configured to perform packet-based media processing on packets of sampled and possibly compressed data transmitted across the packet switched network 102. For example, the packet data may comprise audio data including samples of voice or music, fax data, modem data, and/or telephony signaling tones. Further, the packet-based media processing operations performed by the interface device 104 may include packet data de-jittering, line echo canceling, packet data decoding, and/or sample clock regenerating, among other possible packet-based media processing operations.

As defined herein, a "packet" comprises a series of bits including payload data and a header, which includes control and/or address information relating to the source and destination of the packet. Further, a packet of data may be alternatively referred to as a "frame" or a "cell", depending on the types of computer networks 102 and 106 linked to one another by the interface device 104.

Those of ordinary skill in the art will appreciate that when packet data is transmitted from a source node in a packet switched network to a gateway or endpoint device by way of at least one intermediate node in the packet switched network, the intermediate node may at least temporarily stop accepting the data due to, e.g., traffic congestion, network maintenance, or node failure, thereby causing at least some of the packet data to take alternate routes across the packet switched network to the gateway or endpoint device.

As a result, respective packets of data may take different routes across the packet switched network from the source node to the gateway or endpoint device, in which each route is characterized by a different network transfer latency. As defined herein, "network transfer latency" is the time required for a packet to travel from a source node in a packet switched network to a gateway or endpoint device interposed between the packet switched network and another computer network.

It should further be appreciated that varying network transfer latencies can adversely affect the delivery of packet data to the gateway or endpoint device. For example, respective packets traveling from a source node across the packet switched network may be subject to different time delays, and may therefore be delivered to the gateway or endpoint device after significant delay and/or in an incorrect sequence.

Varying network transfer latencies can also influence a user's perception of the packet data transmission in different ways, depending at least in part on the type of information content of the packet data. For example, in the event the packet data contains voice samples, network transfer latencies that cause the voice samples to be delayed by more than a predetermined time, e.g., about 200 msecs, may significantly degrade the natural dynamics of a telephone conversation. However, because of the bursty and duplex nature of voice transmission, it may be possible to drop at least one voice sample without seriously degrading the perceived quality of the telephone call.

In contrast, in the event the packet data contains fax data, network transfer latencies that cause the fax data to be received in an incorrect sequence or cause at least one of the fax data samples to be dropped may result in undesirable bit errors in a facsimile output. However, because of the simplex nature of fax transmission, it may be possible to allow some delay in the transmission of the fax data without seriously degrading the perceived quality of the fax transmission.

The computer network arrangement 100 (see FIG. 1) minimizes these and other potential adverse affects of network transfer latency on packet data transmission, while reducing a perceived quality degradation of the data transmission, by taking into account the type of information content of the packet data. Specifically, the interface device 104 (see FIG. 1) is configured to adapt itself to the type of information content, e.g., voice, music, or fax, when performing packet-based media processing on the packet data. In this way, the interface device 104 achieves desired Quality of Service (QoS) levels for the type of information content of the packet data.

Figure 2:
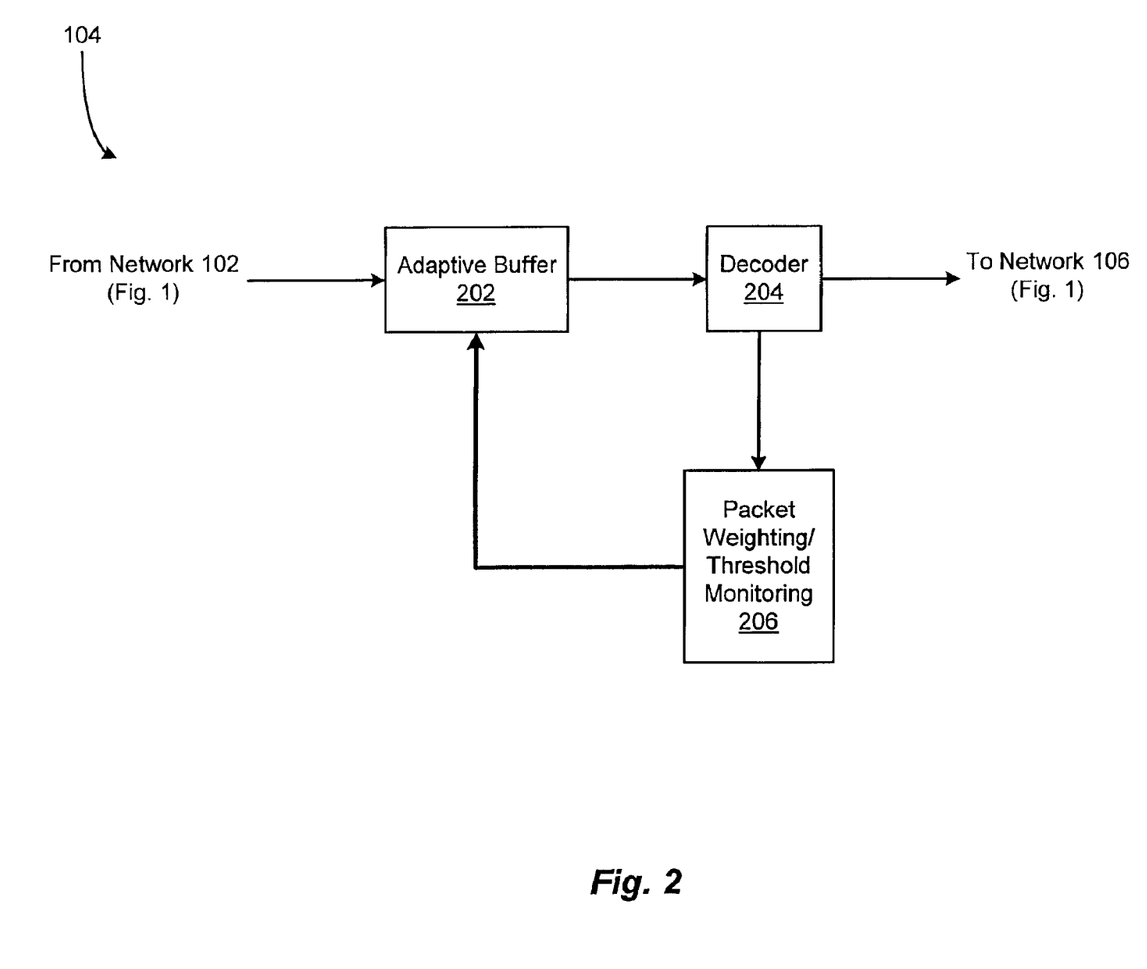
FIG. 2 is a block diagram of an interface device such as a gateway or endpoint device included in the computer network arrangement of FIG. 1.

FIG. 2 depicts a block diagram of the network interface device 104 included in the computer network arrangement 100 (see FIG. 1). In the illustrated embodiment, the interface device 104 is configured to receive at least one group of packets or frames transmitted across the packet switched network 102 (see FIG. 1), perform packet-based media processing operations on the group of packets including sorting and decoding the packets, and provide the sorted and decoded group of packets to the synchronous circuit switched network 106 (see FIG. 1).

Specifically, the interface device 104 receives the group of packets in an adaptive buffer 202, which temporarily stores the packets upon receipt. As described above, varying network transfer latencies may cause respective packets traveling across the packet switched network 102 to be subject to different time delays, thereby causing the respective packets to be delivered to the interface device 104 in an incorrect sequence.

Accordingly, the adaptive buffer 202 is configured to monitor respective sequence numbers of the delivered packets, and sequentially sort the packets in the buffer based on the respective sequence numbers to prepare the packets for further processing as a stream. For example, the respective packet sequence numbers may conform to those employed in the Real-time Transport Protocol (RTP) or any other suitable protocol.

Not only may varying network transfer latencies cause respective packets to be delivered to the interface device 104 in an incorrect sequence, but they may also cause at least some of the packets to be delivered to the interface device 104 only after significant time delay. For this reason, the adaptive buffer 202 is further configured to monitor the respective packet sequence numbers to detect any "gaps", i.e., missing numbers, in the packet number sequence. In the illustrated embodiment, each gap detected in the packet number sequence is indicative of a corresponding packet that may be subject to a significant time delay, which causes that packet to be deemed "late" by the interface device 104.

The interface device 104 is further configured to determine, in a conventional manner, the type of connection setup established by an application controlling the packet data transmission across the packet switched network 102. In the illustrated embodiment, the interface device 104 determines whether the type of the established connection setup is a fax session. In the event a fax session is established, the interface device 104 adapts itself to the "fax" type of information content when performing packet-based media processing on the packet data. Alternatively, if a fax session is not established, then the interface device 104 adapts itself to the "voice" or "music" type of information content of the packet data.

Specifically, when adapting itself to the "voice" type of packet data content, the interface device 104 buffers the packet data flow to achieve a desired QoS level by exploiting certain properties of the voice signal. In the illustrated embodiment, the interface device 104 exploits the following voice signal properties: (1) the energy envelope of a voice signal changes relatively slowly with time, and (2) the nature of voice transmission between two users is essentially half duplex and bursty, i.e., only one user speaks at a time with periods of silence within active speech.

By exploiting the above-described voice signal properties, the interface device 104 can determine whether packets deemed to be late are likely to contain active speech or silence. The interface device 104 can then wait longer for late packets likely to contain active speech and wait a reduced time for those packets likely to contain silence. In this way, the desired QoS level can be achieved during processing of the voice samples.

It is noted that the energy envelope of music signals also changes relatively slowly with time, and that there are normally periods of silence within active portions of the music signal. Accordingly, the interface device 104 can be configured to wait longer for late packets likely to contain active music signals and wait a reduced time for those packets likely to contain silence, thereby achieving the desired QoS level during processing of the music samples.

After sequentially sorting the packet data comprising voice or music samples, the adaptive buffer 202 provides the sorted packet data to a decoder 204, which decodes the packets and, if no late packets are detected, subsequently provides them to the synchronous circuit switched network 106.

In the event the adaptive buffer 202 detects at least one late packet in the packet stream, the decoder 204 provides at least one frame received immediately before the detection of the late packet to a packet-weighting/threshold-monitoring device 206, the operation of which is described below. Further, the adaptive buffer 202 prepares and maintains a state table and a "waiting time" table for the packet stream comprising the at least one late packet.

In the illustrated embodiment, the state table maintained by the adaptive buffer 202 includes a weighted energy value for the frame received immediately before detecting the late packet, an average packet delay time for the packet stream, a pointer to the sorted group of packets stored in the adaptive buffer, the frame size, the coding type, a list of late packet sequence numbers for the stream with assigned waiting times, and the sequence number of the last processed packet.

Further, the waiting time table includes entries representing respective periods of time the interface device 104 is to wait before declaring respective late packets "missing". In the illustrated embodiment, the entries in the waiting time table are selected to achieve the desired QoS level for the voice or music sample transmission, and may be determined either empirically or analytically, e.g., by simulation.

As described above, the interface device 104 exploits voice (or music) signal properties to determine whether packets deemed to be late are likely to contain active speech (or active music) or silence. To this end, the packet-weighting device 206 is configured to calculate the weighted energy value for the frame immediately preceding the late packet. In the illustrated embodiment, calculated energies with higher values indicate that the late packet is more likely to contain active speech (or active music), and calculated energies with lower values indicate that the late packet is more likely to contain silence.

For example, for packet data traffic employing G.711, G.729A, or G.723.1 coding types, the packet-weighting device 206 may calculate the weighted energy value by integrating the voice (or music) samples across the frame. It is noted that because the decoder 204 is configured to maintain internal state information that would be disrupted if the adaptive buffer 202 provided it with a plurality of out-of-sequence frames, the packet-weighting device 206 normally only calculates the weighted energy values for no more than two (2) previous frames. The packet-weighting device 206 then provides the calculated weighted energy values to the adaptive buffer 202, which suitably updates the state table for the packet stream.

Next, the adaptive buffer 202 multiplies the weighted energy values in the state table by predetermined scaling factors, which are based at least on the frame size and the coding type. For example, representative scaling factors that may be employed by the adaptive buffer 202 are listed in the following TABLE:

TABLE

| CODING TYPE | FRAME SIZE | | | |
| --- | --- | --- | --- | --- |
| | 5 msecs | 10 msecs | 20 msecs | 30 msecs |
| G.711 | 0.5 | 0.7 | 0.95 | 1.0 |
| G.729A | — | 0.25 | — | — |
| G.723.1 | — | — | — | 0.5 |

It is noted that the G.711 coding type comprises a sample-by-sample companding algorithm that has a variable frame size. In contrast, the G.729A and G.723.1 coding types have frame sizes that do not vary and are specified by the International Telecommunication Union (ITU) recommendations. Further, the scaling factors for the G.729A and G.723.1 coding types are lower in value than the scaling factors for the G.711 coding type for a given frame size because these coding types typically have internal capabilities for regenerating missing frames. It should be understood, however, that the G.711, G.729A, and G.723.1 coding types are discussed herein merely as illustrative examples, and that other suitable coding types may be employed.

The adaptive buffer 202 then employs each scaled energy value as an index to the time values in the waiting time table, retrieves the indexed waiting time value, and assigns the retrieved waiting time value to the corresponding late packet sequence number, as indicated in the state table for the packet stream.

For example, the waiting time values stored in the waiting time table may typically range between 0 and 200 msecs. Moreover, the scaled energy value may be proportional to the indexed waiting time value. Accordingly, a packet having a scaled energy value of zero (0) may have a corresponding waiting time value of 0 msecs and would therefore be declared missing immediately. Further, a packet having a maximum scaled energy value may have a corresponding maximum waiting time value of, e.g., 200 msecs before being declared missing; and, a packet having an intermediate scaled energy value may have a corresponding intermediate waiting time value between 0 and 200 msecs before being declared missing.

After the adaptive buffer 202 assigns waiting time values, the packet-weighting/threshold-monitoring device 206 monitors actual late packet waiting times and provides information relating to the monitored waiting times to the adaptive buffer 202, which uses this information to determine whether any threshold defined by the time values in the waiting time table has been exceeded. In the event a waiting time value has been exceeded, the corresponding late packet is declared missing and the interface device 104 stops waiting for that packet's arrival, i.e., the missing packet is dropped. The interface device then resumes processing the remaining packets of voice or music samples.

In adapting itself to the "voice" (or "music") type of information content of the packet data, the interface device 104 is configured to wait longer for late packets likely to contain active speech (or active music) and wait a reduced time before dropping late packets likely to contain silence. In this way, adverse affects of network transfer latency on voice (or music) transmission, e.g., a delayed voice (or music) signal, are minimized, and the degradation of a perceived quality of the voice (or music) transmission is reduced.

It is noted that the packet-weighting/threshold-monitoring device 206 may be configured to calculate the percentage of packets in the stream that are determined to be late and/or the percentage of packets in the stream that are subsequently dropped and provide at least one of these calculated percentages to the adaptive buffer 202, which may use it to adjust the time values stored in the waiting time table. For example, the adaptive buffer 202 may use these percentages to offset the time values in the waiting time table either up or down to assure that the desired QoS level is achieved for different levels of network impairment.

As described above, the interface device 104 determines whether the established connection setup type is a fax session. In the illustrated embodiment, the interface device 104 determines whether a fax "store-and-forward" session is established. Such connection setup types are typically established in interface devices that comprise endpoint devices.

Specifically, during the established fax "store-and-forward" session, the interface device 104 appears to an originating facsimile machine coupled to the packet switched network 102 as a destination facsimile machine, and therefore receives a group of packets comprising the complete fax transmission. The adaptive buffer 202 then sorts the group of packets, and provides the sorted packets to the decoder 204, which demodulates/decodes the packets and provides them to a user destination coupled to the synchronous circuit switched network 106. For example, the decoder 204 may provide the decoded packet data to a non-facsimile destination such as an e-mail client. Alternatively, the decoder 204 may retransmit the decoded data as fax signaling, and provide the fax signaling to an actual destination facsimile machine on the synchronous circuit switched network 106.

More specifically, when adapting itself to the "fax" type of packet data content, the adaptive buffer 202 sequentially sorts the packet data and provides the sorted packet data to the decoder 204, which demodulates/decodes the packets and, if no late packets are detected, subsequently provides them to the user destination on the synchronous circuit switched network 106. In the event the adaptive buffer 202 detects at least one late packet comprising fax data, the decoder 204 provides at least one frame preceding the late packet to the packet-weighting/threshold monitoring device 206.

Next, the threshold-monitoring device 206 monitors actual late packet waiting times and provides information relating to the monitored waiting times to the adaptive buffer 202, which uses this information to determine whether a threshold defined by a predetermined time value has been exceeded. For example, the predetermined time value for the fax store-and-forward session may be about 200 msecs.

In the event the predetermined time value has been exceeded, the corresponding late packet is declared missing and the interface device 104 stops waiting for that packet's arrival, i.e., the missing packet is dropped. The interface device then resumes processing the remaining packets of fax data samples.

In adapting itself to the "fax" type of information content of the packet data, the interface device 104 is configured to wait a maximum acceptable time before dropping any late packets containing fax data samples. In this way, adverse affects of network transfer latency on fax transmission, e.g., undesirable bit errors in a facsimile output, are minimized, and the degradation of a perceived quality of the fax transmission is reduced.

Figure 3:
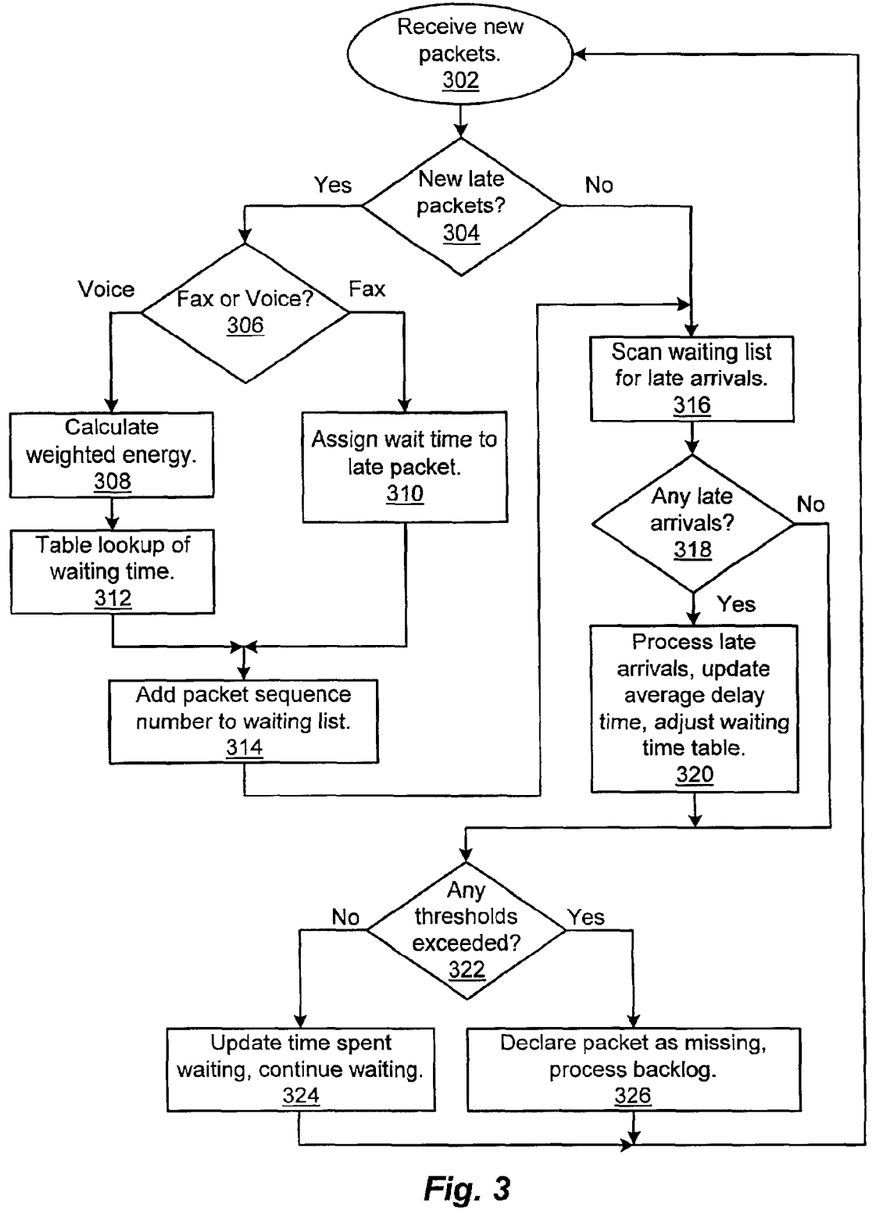
FIG. 3 is a flow diagram of a method of operating the computer network arrangement of FIG. 1 to minimize adverse affects of network transfer latency on packet data transmission while reducing a perceived quality degradation of the data transmission, in accordance with the present invention.

A method of operation of the computer network arrangement 100 (see FIG. 1) is illustrated by reference to FIG. 3. First, a new group of packets is received, as depicted in step 302, by the adaptive buffer 202, which sequentially sorts the packets based on respective sequence numbers. A decision is then made, as depicted in step 304, as to whether any packet is deemed late. In the event at least one packet is deemed late, another decision is made, as depicted in step 306, as to whether the type of information content of the packet data is "fax" or "voice".

In the event the information content type is voice, the packet-weighting/threshold-monitoring device 206 calculates, as depicted in step 308, a weighted energy value for at least one frame immediately preceding the late packet. The adaptive buffer 202 then performs, as depicted in step 312, a table lookup of a waiting time corresponding to the calculated weighted energy value. Alternatively, in the event the information content type is fax, the adaptive buffer 202 assigns, as depicted in step 310, a predetermined waiting time for the late packet. Next, the packet sequence number of the late packet is added, as depicted in step 314, to the list of late packet sequence numbers maintained by the adaptive buffer 202 in the state table for the packet stream. The method of operation then continues at step 316.

In the event it is decided in step 304 that there are no new late packets, the list of late packet sequence numbers is scanned, as depicted in step 316, for any sequence numbers corresponding to late packets that have not yet arrived. A decision is then made, as depicted in step 318, as to whether there are currently any late packet arrivals.

In the event there is at least one late packet arrival, the interface device 104 updates the average packet delay time stored in the state table, and optionally adjusts the time values stored in the waiting time table. Otherwise, a decision is made, as depicted in step 322, as to whether any thresholds defined by the time values in the waiting time table for voice samples, or the predetermined waiting time value for fax data samples, have been exceeded.

In the event no thresholds have been exceeded, the interface device 104 updates, as depicted in step 324, the time spent waiting for the late packet arrivals, and continues waiting for new packet arrivals at step 302. In the event a threshold has been exceeded, the interface device 104 declares, as depicted in step 326, the corresponding late packet missing and resumes processing the backlog voice or fax data samples. The method of operation then loops back to step 302.

It will be appreciated by those of ordinary skill in the art that modifications to and variations of the above-described system and method may be made without departing from the inventive concepts disclosed herein. Accordingly, the invention should not be viewed as limited except as by the scope and spirit of the appended claims.

What is claimed is:

1. A method of providing information content over a computer network, comprising the steps of:
   receiving a plurality of packets by a computer network interface device via a first network, each packet including information content of a predetermined type;
   performing a first determining step including determining whether at least one packet is late by the interface device; and
   in the event at least one packet is late,
   performing a second determining step including determining the type of information content of the respective late packet,
   performing a third determining step including determining a maximum time to wait for the respective late packet to arrive based on the type of information content of the late packet;
   monitoring a time elapsed while waiting for the respective late packet to arrive; and
   in the event the elapsed time waiting for the respective late packet to arrive exceeds the maximum wait time, dropping the late packet.

2. The method of claim 1 further including the step of providing at least a portion of the plurality of packets for transmission across a second network by the interface device.

3. The method of claim 1 wherein the first determining step includes the substeps of monitoring respective sequence numbers of the packets, sequentially sorting the packets based on the respective sequence numbers, and detecting any gaps in the packet number sequence.

4. The method of claim 1 wherein the receiving step includes receiving the plurality of packets by the computer network interface device via the first network, each packet including information content of a predetermined type selected from the group consisting of voice, music, fax, modem, and telephony signaling.

5. A method of providing information content over a computer network, comprising the steps of:
receiving a plurality of packets by a computer network interface device via a first network, each packet including information content of a predetermined type;
performing a first determining step including determining whether at least one packet is late by the interface device; and
in the event at least one packet is late,
performing a second determining step including determining the type of information content of the respective late packet,
performing a third determining step including determining a maximum time to wait for the respective late packet to arrive based on the type of information content of the late packet;
monitoring a time elapsed while waiting for the respective late packet to arrive; and
in the event the elapsed time waiting for the respective late packet to arrive exceeds the maximum wait time, dropping the late packet,
wherein the first determining step includes the substeps of monitoring respective sequence numbers of the packets, sequentially sorting the packets based on the respective sequence numbers, and detecting any gaps in the packet number sequence, and
further including the step of calculating a weighted energy value for at least one received packet having a sequence number immediately preceding that of the respective late packet in the packet number sequence by the interface device.

6. The method of claim 5 wherein the calculating step includes the substep of integrating packet data samples across the at least one received packet immediately preceding the respective late packet.

7. The method of claim 5 wherein the third determining step includes the substep of determining the maximum time to wait for the respective late packet based on the weighted energy value of the at least one received packet immediately preceding the respective late packet.

8. A computer network interface device for providing information content over a computer network, comprising:
at least one memory containing application software; and
at least one processor operative to execute the application software out of the memory for:
receiving a plurality of packets via a first network, each packet including information content of a predetermined type;
determining whether at least one packet is late; and
in the event at least one packet is late,
determining the type of information content of the respective late packet,
determining a maximum time to wait for the arrival of the respective late packet based on the type of information content of the late packet,
monitoring a time elapsed while waiting for the respective late packet to arrive, and
in the event the elapsed time waiting for the respective late packet to arrive exceeds the maximum time to wait, dropping the late packet.

9. The computer network interface device of claim 8 wherein the processor is further operative to execute the application software out of the memory for providing at least a portion of the plurality of packets for transmission across a second network.

10. The computer network interface device of claim 9 wherein the second network comprises a synchronous circuit switched network.

11. The computer network interface device of claim 8 wherein the processor is further operative to execute the application software out of the memory to determine whether at least one packet is late by monitoring respective sequence numbers of the packets, sequentially sorting the packets based on the respective sequence numbers, and detecting any gaps in the packet number sequence.

12. The computer network interface device of claim 11 wherein the processor is further operative to execute the application software out of the memory for calculating a weighted energy value for at least one received packet having a sequence number immediately preceding that of the respective late packet in the packet number sequence.

13. The computer network interface device of claim 12 wherein the processor is further operative to execute the application software out of the memory to calculate the weighted energy value by integrating packet data samples across the at least one received packet immediately preceding the respective late packet.

14. The computer network interface device of claim 12 wherein the processor is further operative to execute the application software out of the memory to determine the maximum time to wait for the respective late packet based on the weighted energy value of the at least one received packet immediately preceding the respective late packet.

15. The computer network interface device of claim 8 wherein the first network comprises a packet switched network.

16. The computer network interface device of claim 8 wherein the type of information content is selected from the group consisting of voice, music, fax, modem, and telephony signaling.

17. The computer network interface device of claim 8 wherein the maximum time to wait for the respective late packet ranges from about 0 to 200 msecs.

18. The computer network interface device of claim 8 wherein the predetermined type of information content is selected from the group consisting of voice, music, fax, modem, and telephony signaling.

19. A computer network interface device for providing information content over a computer network, comprising:
an adaptive buffer configured to receive a plurality of packets via a first network, and to determine whether at least one packet is late, each packet including information content of a predetermined type;
a decoder configured to receive the plurality of packets from the adaptive buffer, to decode the packets, and to provide the packets for transmission across a second network; and
a packet-weighting/threshold-monitoring device configured to monitor a time elapsed while waiting for a respective late packet to arrive,
wherein the adaptive buffer is further configured to determine a maximum time to wait for the arrival of the respective late packet based on the type of information content of the late packet, and to drop the late packet in the event the elapsed time waiting for the respective late packet to arrive exceeds the maximum time to wait for the respective late packet's arrival.

20. The computer network interface device of claim 19 wherein the adaptive buffer is configured to determine whether at least one packet is late by monitoring respective sequence numbers of the packets, sequentially sorting the packets based on the respective sequence numbers, and detecting any gaps in the packet number sequence.

21. The computer network interface device of claim 19 wherein the type of information content is selected from the group consisting of voice, music, fax, modem, and telephony signaling.

22. The computer network interface device of claim 19 wherein the maximum time to wait for the respective late packet ranges from about 0 to 200 msecs.

23. A computer network interface device for providing information content over a computer network, comprising:
   an adaptive buffer configured to receive a plurality of packets via a first network, and to determine whether at least one packet is late, each packet including information content of a predetermined type;
   a decoder configured to receive the plurality of packets from the adaptive buffer, to decode the packets, and to provide the packets for transmission across a second network; and
   a packet-weighting/threshold-monitoring device configured to monitor a time elapsed while waiting for a respective late packet to arrive,
   wherein the adaptive buffer is further configured to determine a maximum time to wait for the arrival of the respective late packet based on the type of information content of the late packet, and to drop the late packet in the event the elapsed time waiting for the respective late packet to arrive exceeds the maximum time to wait for the respective late packet's arrival,
   wherein the packet-weighting/threshold-monitoring device is further configured to calculate a weighted energy value for at least one received packet having a sequence number immediately preceding that of the respective late packet in the packet number sequence.

24. The computer network interface device of claim 23 wherein the packet-weighting/threshold-monitoring device is configured to calculate the weighted energy value by integrating packet data samples across the at least one received packet immediately preceding the respective late packet.

25. The computer network interface device of claim 23 wherein the adaptive buffer is further configured to determine the maximum time to wait for the respective late packet based on the weighted energy value of the at least one received packet immediately preceding the respective late packet.

26. A computer network interface device for providing information content over a computer network, comprising:
   an adaptive buffer configured to receive a plurality of packets via a first network, and to determine whether at least one packet is late, each packet including information content of a predetermined type;
   a decoder configured to receive the plurality of packets from the adaptive buffer, to decode the packets, and to provide the packets for transmission across a second network; and
   a packet-weighting/threshold-monitoring device configured to monitor a time elapsed while waiting for a respective late packet to arrive,
   wherein the adaptive buffer is further configured to determine a maximum time to wait for the arrival of the respective late packet based on the type of information content of the late packet, and to drop the late packet in the event the elapsed time waiting for the respective late packet to arrive exceeds the maximum time to wait for the respective late packet's arrival,
   wherein the first network comprises a packet switched network.

27. A computer network interface device for providing information content over a computer network, comprising:
   an adaptive buffer configured to receive a plurality of packets via a first network, and to determine whether at least one packet is late, each packet including information content of a predetermined type;
   a decoder configured to receive the plurality of packets from the adaptive buffer, to decode the packets, and to provide the packets for transmission across a second network; and
   a packet-weighting/threshold-monitoring device configured to monitor a time elapsed while waiting for a respective late packet to arrive,
   wherein the adaptive buffer is further configured to determine a maximum time to wait for the arrival of the respective late packet based on the type of information content of the late packet, and to drop the late packet in the event the elapsed time waiting for the respective late packet to arrive exceeds the maximum time to wait for the respective late packet's arrival,
   wherein the second network comprises a synchronous circuit switched network.

28. A system for providing information content over a computer network, comprising:
   a first network;
   a second network; and
   a computer network interface device interposed between the first and second networks,
   wherein the computer network interface device is configured to receive a plurality of packets via the first network and provide at least a portion of the plurality of packets for transmission across the second network, and
   wherein the computer network interface device is further configured to wait a predetermined time for at least one late packet to arrive via the first network, the predetermined wait time being based on a type of information content of the late packet.

29. The system of claim 28 wherein the computer network interface device comprises a gateway device.

30. The system of claim 28 wherein the computer network interface device comprises an endpoint device.

31. The system of claim 28 wherein the type of information content of the late packet is voice and the predetermined wait time is further based on whether the late packet contains active speech or silence.

32. The system of claim 28 wherein the type of information content of the late packet is fax and the predetermined wait time is fixed.

33. A system for providing information content over a computer network, comprising:
   a first network;
   a second network; and
   a computer network interface device interposed between the first and second networks,
   wherein the computer network interface device is configured to receive a plurality of packets via the first network and provide at least a portion of the plurality of packets for transmission across the second network, and wherein the computer network interface device is further configured to wait a predetermined time for at least one late packet to arrive via the first network, the predetermined wait time being based on a type of information content of the late packet, wherein the first network comprises a packet switched network and the second network comprises a circuit switched network.

* * * * *